(12) United States Patent
Sonnek et al.

(10) Patent No.: US 11,634,010 B2
(45) Date of Patent: Apr. 25, 2023

(54) METHOD FOR THE START-UP OF AN AIR-CONDITIONING SYSTEM, COMPUTER-READABLE STORAGE MEDIUM, AND AIR-CONDITIONING SYSTEM

(71) Applicant: Webasto SE, Stockdorf (DE)

(72) Inventors: Sebastian Sonnek, Stockdorf (DE); Daniel Thürmer, Stockdorf (DE); Christian Kirsch, Stockdorf (DE); Jörg Ruthenberg, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 642 days.

(21) Appl. No.: 16/611,635

(22) PCT Filed: May 4, 2018

(86) PCT No.: PCT/EP2018/061526
§ 371 (c)(1),
(2) Date: Nov. 7, 2019

(87) PCT Pub. No.: WO2018/206433
PCT Pub. Date: Nov. 15, 2018

(65) Prior Publication Data
US 2020/0062083 A1 Feb. 27, 2020

(30) Foreign Application Priority Data

May 8, 2017 (DE) ..................... 10 2017 109 863.1

(51) Int. Cl.
*B60H 1/22* (2006.01)
*B60H 1/00* (2006.01)
*H04L 12/40* (2006.01)

(52) U.S. Cl.
CPC ....... *B60H 1/2218* (2013.01); *B60H 1/00428* (2013.01); *B60H 1/00657* (2013.01);
(Continued)

(58) Field of Classification Search
CPC .............. B60H 1/2218; B60H 1/00428; B60H 1/00657; B60H 1/00778; B60H 1/2206;
(Continued)

(56) References Cited

FOREIGN PATENT DOCUMENTS

DE 10257030 A1 12/2003
DE 10241587 A1 * 4/2004 ......... B60H 1/00642
(Continued)

OTHER PUBLICATIONS

International Searching Authority. International Search Report and Written Opinion for application PCT/EP2018/061526, dated Aug. 27, 2018. With Translation.
(Continued)

*Primary Examiner* — Emmanuel E Duke
(74) *Attorney, Agent, or Firm* — Quarles & Brady LLP

(57) ABSTRACT

The commissioning of an air conditioning system requires a series of manual steps, which leads to inefficient commissioning. A method is therefore provided for commissioning an air conditioning system of a vehicle, including the following:
a) Reading in a target data record indicating a target vehicle state;
b) Recording an actual data record indicating an actual vehicle state by measuring at least one signal and/or communicating with at least one vehicle component;
c) Comparing the actual vehicle state with a target vehicle state;
d) Activating at least one function of the air conditioning system only if the actual vehicle state corresponds to the target vehicle state.

14 Claims, 2 Drawing Sheets

(52) U.S. Cl.
CPC ....... B60H 1/00778 (2013.01); B60H 1/2215 (2013.01); H04L 12/40 (2013.01); *B60H 2001/2234* (2013.01); *B60H 2001/2243* (2013.01); *H04L 2012/40273* (2013.01)

(58) Field of Classification Search
CPC .................... B60H 1/00; B60H 1/2215; B60H 2001/2234; B60H 2001/2243; B60H 2001/2231; B60H 2001/225; H04L 12/40; H04L 2012/40273
See application file for complete search history.

(56) References Cited

FOREIGN PATENT DOCUMENTS

| | | |
|---|---|---|
| DE | 10241587 A1 | 4/2004 |
| DE | 102007040200 A1 | 2/2009 |
| DE | 102016101093 A1 | 7/2016 |
| EP | 2688267 A1 * | 1/2014 ......... B60H 1/00657 |
| EP | 2688267 A1 | 1/2014 |
| RU | 2416530 C2 | 4/2011 |
| WO | 2015067504 A1 | 5/2015 |

OTHER PUBLICATIONS

International Searching Authority. Intellectual Search Report and Written Opinion for application PCT/EP2018/061526. dated Aug. 27, 2018. With Translation.

Federal Institute Industrial Property of Russia. Office Action for application 2019139959. dated Jun. 19, 2020. With English Translation.

Federal Institute Industrial Property of Russia. Search Report for application 2019139959. dated Jun. 19, 2020. With English Translation.

* cited by examiner

METHOD FOR THE START-UP OF AN AIR-CONDITIONING SYSTEM, COMPUTER-READABLE STORAGE MEDIUM, AND AIR-CONDITIONING SYSTEM

CROSS-REFERENCE TO RELATED APPLICATIONS

This application represents the national stage entry of PCT International Patent Application No. PCT/EP2018/061526 filed on May 4, 2018 and claims priority to German Patent Application No. DE 10 2017 111 373.8 filed May 24, 2017, German Patent Application No. DE 10 2017 109 863.1 filed May 8, 2017. The contents of each of these applications are hereby incorporated by reference as if set forth in their entirety herein.

DESCRIPTION

The disclosure relates to a method for commissioning an air conditioning system of a vehicle, a corresponding computer-readable storage medium and an air conditioning system.

In many cases, it is possible to retrospectively install a parking heater in a vehicle. After installation, it is necessary to put the appropriate vehicle components into operation properly to ensure reliable function and warranty claims. For commissioning, a technician can connect a laptop to the parking heater. A software on the laptop can then perform and monitor the commissioning and produce a corresponding commissioning report for the documentation.

Since the vehicles from different manufacturers differ greatly, it is necessary that the commissioning software is specially configured for a specific vehicle type. The technician must therefore select the appropriate vehicle type and the installed parking heater before the parking heater can be commissioned. Commissioning must also be closely monitored, which is time-consuming and costly. Finding errors, for example incorrectly or poorly connected cables, is time consuming.

Starting from the described prior art, it is the object of the disclosure to specify a method for commissioning an air conditioning system that enables automatic commissioning. In addition, a corresponding computer-readable storage medium is to be specified. In addition, it is the object of the disclosure to specify an air conditioning system that facilitates the discovery of errors.

The object is achieved by a method for commissioning an air conditioning system of a vehicle according to claim 1.

In particular, the object is achieved by a method for commissioning an air conditioning system of a vehicle, comprising:
a) Reading a target data record indicating a target vehicle state;
b) Capturing an actual data record indicating an actual vehicle state by measuring at least one signal and/or communicating with at least one vehicle component;
c) Comparing the actual vehicle state with a target vehicle state;
d) Activating at least one function of the air conditioning system only if the actual vehicle state corresponds to the target vehicle state.

A core of the disclosure is that functions of the air conditioning system are activated only if error-free commissioning has been carried out. An error within the meaning of the disclosure occurs if the recorded actual vehicle state does not correspond to the target vehicle state. According to the disclosure, an automatic determination of the operability of the air conditioning system can be carried out in a simple way.

In one embodiment, the target data record can specify a plurality of vehicle components and/or signals from vehicle components.

It is advantageous if information about vehicle components is included in the target data record. For example, the target data record may contain that certain vehicle components must be present. If the comparison of the target vehicle state with the actual vehicle state determines that not all the required vehicle components are present, the corresponding function of the air conditioning system is not activated. Thus, it can also be determined whether an incorrect target set is read in, for example because the target data record for another type of vehicle is provided.

In one embodiment, the detection can be carried out by measuring signals that can be transmitted on a bus system, in particular on an air conditioning bus and/or a vehicle bus.

A variety of possibilities are conceivable for how the actual data record can be recorded. It is particularly advantageous if communication via bus systems is monitored. This is a particularly simple implementation, as there is no need to engage with an existing vehicle system. Another possibility is that the actual data record is recorded by direct or indirect communication with the vehicle components. Bus communication can be included here too. Direct communication (for example, from a gateway device) has the advantage that characteristics of the vehicle components can be interrogated, and thus in general more targeted data can be collected. The time required for commissioning is thus reduced.

In one embodiment, measuring can include measuring voltage and/or current on a plug connector of a gateway device.

Thus, it is not only possible to check the presence of components, but also whether the components are addressed correctly. For this purpose, voltages and currents that are output via plug connectors can be measured. The target data record can therefore indicate information about permissible currents and voltages. This prevents impermissible currents or voltages from damaging components that are also connected to the air conditioning system. The resilience of the entire system is increased as a result.

In one embodiment, communicating can include reading status information and/or control commands on a vehicle bus.

When status information and/or control commands are read out from a vehicle bus to determine the actual state of the vehicle, the information that forms the actual data record can be collected in a simple way.

In one embodiment, the comparison can include a comparison of whether the data of the actual data record is contained in the target data record.

It is therefore also possible that the actual data record forms a subset of the target data record. The described comparison can be used to determine the absence of individual vehicle components. It can also be used to determine whether individual vehicle components are working as desired.

In one embodiment, the target data record may designate at least one vehicle component, wherein the comparison may include a check of whether a signal from the at least one designated vehicle component is measured.

By determining whether the signal from at least one vehicle component is measured, another possibility is indicated for determining that an expected vehicle component is present.

In one embodiment, the method may comprise:
Checking a/the number of vehicle components using the target data record and the actual data record;
Saving an error log using the checked number of vehicle components.

An error log can also be created so that problems can be fixed in a targeted manner if the air conditioning system has not been put into operation without errors. For example, the error log allows a technician to identify and replace a damaged vehicle component.

In one embodiment, the target data record is compared with the actual data record as part of a commissioning routine. This commissioning routine may be subdivided by function, for example into subroutines. Each subroutine can check the presence and/or function of a subset of vehicle components.

In one embodiment, different configuration data records are used to individualize the commissioning routine, especially the subroutines, for example for special vehicle and engine types.

In one embodiment, at least some of the mentioned subroutines run in parallel or quasi parallel. Thus, the commissioning process, in which a response or action of the vehicle and/or the corresponding vehicle component frequently has to be waited for, can be considerably accelerated. In one embodiment, an (additional) configuration data record or the already mentioned configuration data record specifies an order and/or a start time (for example, in response to an event) for the execution of at least some of the subroutines. In a (further) embodiment, a configuration data record or the configuration data record specifies which subroutines can be executed in parallel.

The object is further achieved by a computer-readable storage medium according to claim 9.

In particular, the object is achieved by a computer-readable storage medium that contains instructions that cause at least one processor to implement a method according to any one of the preceding claims when the instructions are carried out by the processor.

There are similar or identical advantages to those described above in connection with the method.

The computer-readable storage medium may include one or more configuration data records as described above.

The object is also achieved by an air conditioning system for a vehicle according to claim 10.

In particular, we achieved the object by an air conditioning system for a vehicle, comprising:
a vehicle bus to which a large number of vehicle components are connected and which transmits an actual data record indicating an actual vehicle state via the vehicle bus;
a gateway device that is communicatively connected to the plurality of vehicle components via the vehicle bus, wherein
the gateway device is designed to compare the actual vehicle state with a target vehicle state, wherein a function of the gateway device is activated only if the actual vehicle state corresponds to the target vehicle state.

A gateway device may be provided to carry out a check of the vehicle components connected to the vehicle bus. A vehicle component may be any component that is installed in the vehicle before or after delivery of the vehicle or not.

In one embodiment, a control unit of the vehicle may be provided, wherein the gateway device may be designed to assign a vehicle identification transmitted by the control unit via the vehicle bus to a target vehicle state.

In one embodiment, the gateway device implements at least one of the previously described methods.

The vehicle identification can therefore be used to assign a target vehicle state. Thus a check can be made as to whether the correct target vehicle state is used for comparison for the vehicle. If the correct target vehicle state is not used, an error message can be issued. Commissioning can also be aborted immediately, as further checking cannot lead to correct results.

In one embodiment, the air conditioning system may include a heater, in particular an auxiliary heater, and at least one temperature sensor, each of which may be communicatively connected to the gateway device via an air conditioning bus, wherein the gateway device may be designed to activate the auxiliary heater if a temperature value provided by the temperature sensor is specified by the target data record.

The operability of the air conditioning system can therefore also be checked in the interaction of different components. First, the interior of a vehicle can be heated by the heater. The measured temperature is then compared to an expected temperature. If there is a discrepancy, a corresponding error can be documented, and the function of the gateway device is not activated. It is therefore possible to test complex scenarios so that reliable operation of the air conditioning system can be guaranteed, provided that the commissioning runs successfully.

Further embodiments result from the dependent claims.

The disclosure is described below in more detail on the basis of several exemplary embodiments with reference to the accompanying figures. In the figures.

In the following description, the same reference numbers are used for the same and equivalent parts.

Figure 1:
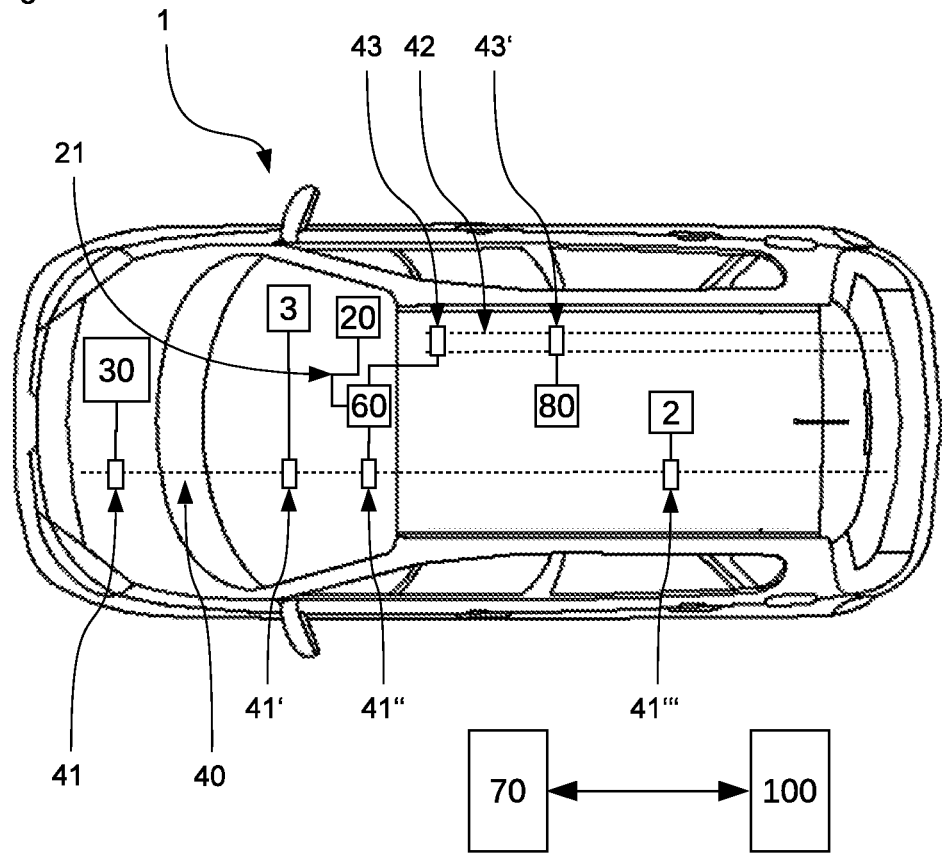
FIG. 1 shows a schematic view of a vehicle with an air conditioning bus, wherein some components are connected to the air conditioning bus, including an air conditioning device.

The vehicle 1 shown in FIG. 1 comprises a heater 30, a gateway device 60, an operating device 2, a ventilation device 20 and a fan flap 3. The heater 30, the gateway device 60 and the operating device 2 are connected to the air-conditioning bus 40 via connections 41, 41', 41", 41''' and are connected to each other via the air-conditioning bus 40. In the exemplary embodiment shown, the air conditioning bus 40 is in the form of a W-BUS.

In the exemplary embodiment of FIG. 1 the operating device 2 is in the form of an input/output device. The driver of the vehicle 1 can enter a setpoint temperature as the target temperature in the interior of vehicle 1 via the operating device 2. The operating device 2 then sends the target temperature to the gateway device 60 as a target parameter via the connection 41 on the air conditioning bus 40. The gateway device 60 includes a temperature sensor that measures the temperature in the interior of the vehicle 1. If the setpoint temperature set by the driver does not correspond to the measured temperature value inside the vehicle 1, the gateway device 60 sends a control command to the heater 30 via the air conditioning bus 40. If the gateway device 60 has determined that the temperature inside the vehicle 1 is too low, the heater 30 is caused to heat. The heater 30 heats the vehicle interior until the gateway device 60 measures by means of the temperature sensor thereof that the setpoint temperature entered by the vehicle owner is reached.

In order to enable efficient heating of the interior of the vehicle 1, the gateway device 60 sends additional control commands to the fan flap 3. The fan flap 3 includes an actuator, for example a servo motor or a stepper motor, which is designed to change an adjustment angle of the fan flap 3. In the embodiment shown, the fan flap 3 is adjusted, for example to 90 degrees, in such a way that the greatest possible air flow can flow through it.

In order for the heated air to flow through the fan flap 3, the gateway device 60 also sends a pulse width modulation signal (PWM signal) to the ventilation device 20. For this purpose, the gateway device 60 comprises a PWM controller, for example a microcontroller, which outputs a corresponding signal via a ventilation connection 21 that connects the gateway device 60 to the ventilation device 20. The ventilation device 20 comprises an actuator that is driven using the PWM signal. A fan is arranged on the actuator.

Furthermore, FIG. 1 shows a vehicle bus 42. The gateway device 60 and a control unit 80 are connected to the vehicle bus 42. The gateway device 60 is designed as a slave of the vehicle bus 42. The gateway device 60 therefore has a dual function. On the one hand it acts as a master on the air conditioning bus 40 and on the other hand as a slave on the vehicle bus 42. In another embodiment, the gateway device 60 has only a monitoring function with respect to the vehicle bus 42 and only monitors the traffic on the vehicle bus 42. This means that the gateway device 60 can also not be in the form of a master or as a slave on the vehicle bus 42. In the illustrated exemplary embodiment of FIG. 1, the control unit 80 is used to receive a user input and to make the user input available via the vehicle bus 42 to the gateway device as vehicle data. The gateway device 60 processes the vehicle data of the control unit 80 and generates control commands, which are transmitted via the air-conditioning bus 40 to the air conditioning device 30 for the control of the air conditioning device 30. The gateway device 60 is thus used as a bridge between the air conditioning bus 40 and the vehicle bus 42 in the exemplary embodiment shown.

FIG. 1 also shows a laptop 70 that is communicatively connected to a web server 100. The web server 100 stores a software with a commissioning software, which is adapted by different configuration data records to different vehicle types and engine types from different manufacturers. In one embodiment, there is a commissioning software that selects and performs a specific commissioning routine for a specific vehicle and/or engine type depending on a user input and/or a captured signal. On the laptop 70 a vehicle type can be selected in the aforementioned embodiment, so that a corresponding commissioning routine is processed. By means of the laptop 70, the software can be transferred to the gateway device 60 with the commissioning software or a stand-alone commissioning software can be transferred to the gateway device 60.

Figure 3:
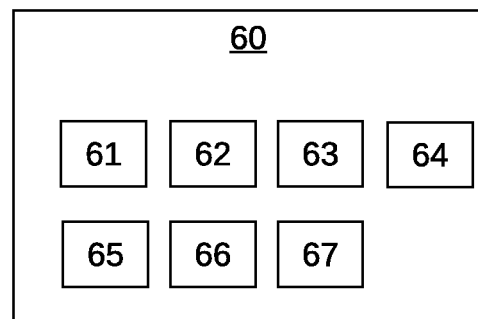
FIG. 3 shows a schematic view of a gateway device.

The gateway device 60 includes a memory device 65 (see FIG. 3) that stores software. The software contains instructions specifying the control of the heater 30 as well as the ventilation device 20. In addition, the software specifies which components must be installed in the vehicle in order for a heating system to be implemented reliably. The installed components are determined in particular by the vehicle type. The software, in particular the included commissioning software, therefore includes information about which vehicle type it can be used with. A boot loader is also provided in the memory device 65 for loading or flashing the software. The boot loader contains some basic functionality, such as providing a communication interface to receive data. In particular, the software that can be used to control the connected components in the vehicle 1 during commissioning can be received via the communication interface. For commissioning the vehicle components 2, 3, 20, 30, 80 connected to the gateway device 60, the gateway device 60 stores the commissioning software. Therefore, no external software component, for example, on a laptop 70, is necessary, since the commissioning is carried out by the gateway device 60 itself. In the exemplary embodiment shown, the commissioning software is part of the software or firmware. Therefore, the terms are used synonymously below.

Figure 2:
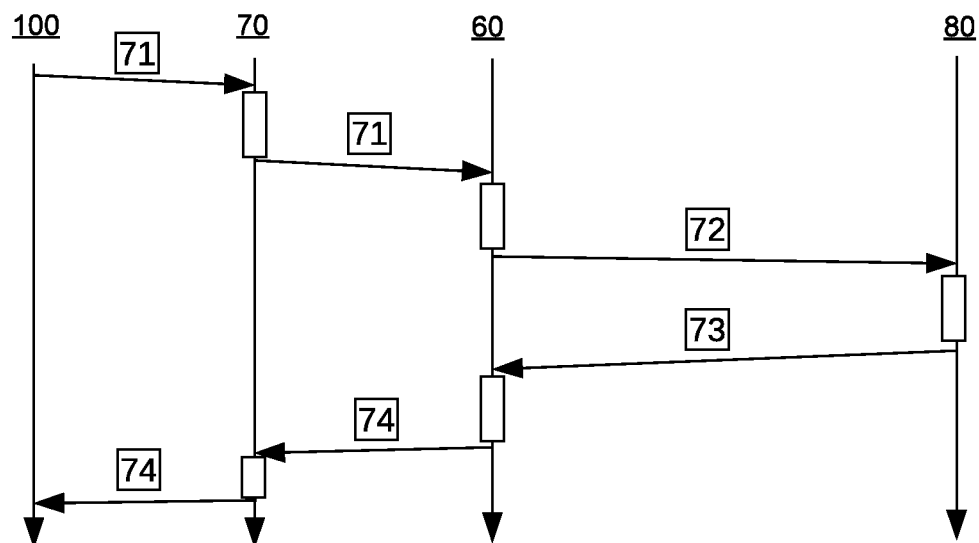
FIG. 2 shows a sequence diagram for commissioning an air conditioning system.

FIG. 2 shows a sequence diagram showing the steps for commissioning an air conditioning system. First, the configured software or firmware 71 is downloaded from the web server 100 to a mobile terminal device 70, such as a laptop 70. For this purpose, the user specifies the vehicle type and/or engine type, so that a firmware 71 configured according to the vehicle is selected by the webserver 100 and transferred to the mobile terminal device 70.

The mobile terminal device 70 is then connected to the gateway device 60. This connection can be wired, for example via USB, or wireless, for example via Bluetooth. In the next step, the firmware 71 is transferred to the gateway device 60. The correct transfer of the data can be monitored by a comparison with a checksum, for example, a hash value.

The commissioning can be initiated in various ways. In one exemplary embodiment, commissioning can be started automatically after successful transmission. In the exemplary embodiment shown, it is necessary for the driver or a technician to start the commissioning by means of the connected mobile terminal device 70.

After commissioning has started, the gateway device 60 sends one or more query signals 72 via the vehicle bus 42 and the air conditioning bus 40 to identify the components 2, 3, 30, 80 connected to the busses 40, 42. In particular, the gateway device 60 determines whether the vehicle equipment required or expected for the firmware 71 is present. The information items about the vehicle components together thus form an actual data record, which indicates an actual state. For example, by comparing the actual data record with a target data record or a target state by means of the gateway device 60, a check can be made as to whether the correct firmware 71 is downloaded from the web server 100 by the technician or the driver. If it is determined that not all the expected components are connected, an error is saved. In one exemplary embodiment, the gateway device 60 does not send a signal via the vehicle bus 42, but only monitors the signal in order to determine the individual vehicle components by interrogating signals or messages from the individual vehicle components.

In addition, components connected to the air conditioning bus 40 can be automatically identified. For example, the heater 30 sends a component identification number 73 to the gateway device 60 in response to the query signal 72. The fan flap 3, the operating device 2 and the ventilation device 20 also send corresponding component identification numbers 73 to the gateway device 60. Together, component identification numbers 73 form part of the actual data record.

In addition, vehicle components 20 or component groups or function groups or functions can be identified and/or tested in different commissioning subroutines. The components can be directly connected to or work with the gateway device 60 to perform a specific function. For example, a test is carried out as to whether correct voltages are present at the outputs of the directly connected vehicle components 20. It is also possible to identify the directly connected vehicle components 20 by transmitting or interrogating an identification number.

The gateway device 60 can determine a commissioning routine using the collected information, i.e. using the actual data record. The commissioning routine can be generated dynamically, for example, using one or more configuration data records. One or more routines can be selected from a number of routines, for example the commissioning subroutines, that are stored as part of the firmware 71. The configuration data record can also specify which components and in what order they can be put into operation and tested.

The vehicle components 2, 3, 30 that are connected to the air conditioning bus 40 are successively put into operation in order to determine their operability. First, the pipes of a heating circuit that are connected to the heater 30 are filled with water or a similar heat carrier. By means of sensors, a check is carried out as to whether the pipes are filled correctly. In one exemplary embodiment, the heater 30 is put into operation after a filling test. Whether the filling was successful is determined by a temperature sensor. If the temperature rises too fast or exceeds a predetermined maximum temperature, this is an indicator that the heating circuit has not been properly filled. Otherwise, correct filling can be assumed.

In addition, it is determined whether the temperature in the vehicle interior corresponds to the setpoint vehicle temperature value following a predetermined time interval.

In one embodiment, at least some of the commissioning subroutines run in parallel with each other, which significantly shortens the time required for commissioning. For example, the fan flaps 3 and the ventilation device 20 can be put into operation as the first function group, while filling the heating circuit (second function group) is already being carried out.

After all the components connected to the air conditioning bus 40 have been tested, a commissioning report 74 is stored in the gateway device 60. In addition, the commissioning report 74 can be transmitted to the mobile terminal device 70. The mobile terminal device 70 can store the commissioning report 74 on the web server 100 in turn, so that warranty claims can be reported. For this purpose, the gateway device 60 can provide the commissioning report 74 with an electronic signature, so that a tamper-proof assignment of the commissioning report 74 and gateway device 60 can be created.

FIG. 3 shows once again a schematic representation of the gateway device 60. The gateway device 60 includes a computing unit 61, which is in the form of a microcontroller, for example. The computing device 61 is designed to execute a firmware stored in the memory device 65. In addition, the gateway device 60 has a communication device 62 for wireless communication, for example via Bluetooth. The bus communication device 63 of the gateway device 60 is designed for receiving and sending data via at least one bus 40, 42. The received data can be stored in the memory device 65, so that the computing unit 61 can process the data. Furthermore, the gateway device 60 has a PWM connection, by means of which a PWM signal can be sent to a consumer, for example the fan device 20. The computing device 61 can be used to generate the PWM signal. In addition, the gateway device 60 has a temperature sensor 66 and/or a pressure sensor 67. The two sensors 66 and 67 can output signals that are interpreted by the computing device 61 as temperature or pressure and can be temporarily stored in the memory device 65. Using the sensor data, the computing device 61 can calculate control commands, which can be used to control the heater 30.

At this point it should be noted that parts described above, in particular the details shown in the drawings, are claimed as essential to the disclosure on their own and in any combination. Amendments to this are familiar to the person skilled in the art. In particular, it is common practice for the person skilled in the art to combine the individual exemplary embodiments in any form.

In addition, one or more of the following steps may be part of the method according to the disclosure:
1) Selecting firmware on a mobile terminal device;
2) Downloading the firmware from a web server to the mobile terminal device;
3) Transferring the firmware from the mobile terminal device to a gateway device;
4) Loading the firmware on the gateway device;
5) Initiating the commissioning of an air conditioning system by a user of the mobile terminal device;
6) Reading a vehicle identification from a vehicle bus; and
7) Determining whether the firmware can be assigned to a vehicle type associated with the vehicle identification;
8) Identifying vehicle components connected to the air conditioning bus;
9) Checking the vehicle components connected to the air conditioning bus;
10) Automatic commissioning of the vehicle components, wherein automatic commissioning may include:
   a. Filling pipes with a fluid, in particular a heat carrier;
   b. Starting a heater connected to the pipes;
   c. Measuring a temperature, especially in the driver's cab of a vehicle;
   d. Checking fan flaps, wherein confirmation can be performed by a technician;
11) Placing a log data record on the gateway device, especially in a memory device of the gateway device;
12) Transferring the log data record to a web server.

REFERENCE CHARACTER LIST

1 Vehicle
2 Control element
3 Fan flap
20 Ventilation device
21 Ventilation connection
30 Heater/parking heating
40 Air conditioning bus, W-BUS
41, 41', 41" Connection for W-BUS
42 Vehicle bus, LIN-BUS
43, 43' Connection for vehicle bus/LIN-BUS
55 Computing unit or microcontroller
60 Gateway device
61 Computing device/microcontroller
62 Wireless communication device
63 BUS communication device
64 PWM connection
65 Memory device
66 Temperature sensor
67 Pressure sensor
70 (Mobile) terminal device
71 Firmware
72 Interrogation signal
73 Component identification number
74 Commissioning record
80 Control unit
100 Web server

The invention claimed is:

1. Method for commissioning an air conditioning system of a vehicle, comprising:
    (a) Reading in a target data record indicating a target vehicle state;
    (b) Recording an actual data record indicating an actual vehicle state by measuring at least one signal and/or communicating with at least one vehicle;
    c) Comparing the actual vehicle state with a target vehicle state;
    d) Activating at least one function of the air conditioning system only if the actual vehicle state corresponds to the target vehicle state.

2. Method according to claim 1,
wherein
the target data record specifies a number of vehicle components and/or signals from vehicle components.

3. Method according to claim 1,
wherein
the recording is carried out by measuring signals transmitted on a bus system.

4. Method according to claim 3, wherein the bus system is an air conditioning bus and/or a vehicle bus.

5. Method according to claim 1,
wherein
measuring comprises measuring voltage and/or current on a plug connector of a gateway device.

6. Method according to claim 1,
wherein
communication comprises reading status information and/or control commands on a vehicle bus.

7. Method according to claim 1,
wherein
the comparison comprises a comparison of whether the data of the actual data record is contained in the target data record.

8. Method according to claim 1,
wherein
the target data record designates at least one vehicle component, wherein the comparison comprises a check of whether a signal from the at least one designated vehicle component is measured.

9. Method according to claim 1,
further comprising
    Checking a/the number of vehicle components using the target data record and the actual data record;
    Saving an error log using the tested number of vehicle components.

10. Computer-readable storage medium containing instructions that cause at least one processor to implement a method according to claim 1 when the instructions are executed by the processor.

11. Air conditioning system for a vehicle, comprising:
    a vehicle bus to which a plurality of vehicle components are connected, which transmits an actual data record via the vehicle bus that indicates an actual vehicle state;
    a gateway device that is communicatively connected to the plurality of vehicle components via the vehicle bus,
    the gateway device is designed to compare the actual vehicle state with a target vehicle state, wherein a function of the gateway device is activated only if the actual vehicle state corresponds to the target vehicle state.

12. Air conditioning system according to claim 11,
wherein
the gateway device comprises a memory device for the storage of a number of target vehicle states, wherein the gateway device is designed to select a target vehicle state for the comparison using a vehicle identification.

13. Air conditioning system according to claim 11,
further comprising
a control unit of the vehicle, wherein the gateway device is designed to assign a vehicle identification transmitted by the control unit via the vehicle bus to a target state.

14. Air conditioning system according to claim 11,
further comprising
    a heater, in particular an auxiliary heater, and at least one temperature sensor, each of which is communicatively connected to the gateway device via an air conditioning bus,
wherein the gateway device is designed to activate the heater if a temperature value provided by the temperature sensor is specified by the target data record.

* * * * *